United States Patent
Ehrlich et al.

(10) Patent No.: US 8,572,323 B2
(45) Date of Patent: Oct. 29, 2013

(54) CACHE RESULT REGISTER FOR QUICK CACHE INFORMATION LOOKUP

(75) Inventors: Robert Ehrlich, Round Rock, TX (US); Kevin C. Heuer, Austin, TX (US); Robert A. McGowan, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 481 days.

(21) Appl. No.: 12/982,856

(22) Filed: Dec. 30, 2010

(65) Prior Publication Data
US 2012/0173825 A1    Jul. 5, 2012

(51) Int. Cl.
*G06F 12/08* (2006.01)
(52) U.S. Cl.
USPC ........... 711/122; 711/118; 711/145; 711/170; 711/E12.016; 711/E12.043; 714/E11.207; 717/124
(58) Field of Classification Search
None
See application file for complete search history.

(56) References Cited

U.S. PATENT DOCUMENTS

| | | | | |
|---|---|---|---|---|
| 5,247,653 A * | 9/1993 | Hung | | 711/129 |
| 5,513,344 A * | 4/1996 | Nakamura | | 714/42 |
| 5,845,309 A * | 12/1998 | Shirotori et al. | | 711/3 |
| 6,101,578 A * | 8/2000 | Patwardhan et al. | | 711/125 |
| 6,766,419 B1 * | 7/2004 | Zahir et al. | | 711/133 |
| 2006/0265551 A1 * | 11/2006 | Grandou et al. | | 711/128 |

* cited by examiner

*Primary Examiner* — Michael Krofcheck
(74) *Attorney, Agent, or Firm* — Yudell Isidore Ng Russell PLLC

(57) ABSTRACT

Each level of cache within a memory hierarchy of a device is configured with a cache results register (CRR). The caches are coupled to a debugger interface via a peripheral bus. The device is placed in debug mode, and a debugger forwards a transaction address (TA) of a dummy transaction to the device. On receipt of the TA, the device processor forwards the TA via the system bus to the memory hierarchy to initiate an address lookup operation within each level of cache. For each cache in which the TA hits, the cache controller (debug) logic updates the cache's CRR with Hit, Way, and Index values, identifying the physical storage location within the particular cache at which the corresponding instruction/data is stored. The debugger retrieves information about the hit/miss status, the physical storage location and/or a copy of the data via direct requests over the peripheral bus.

20 Claims, 9 Drawing Sheets

CACHE RESULT REGISTER FOR QUICK CACHE INFORMATION LOOKUP

BACKGROUND

1. Technical Field

The embodiments described herein generally relates to debugging systems and processes and in particular to debugging of devices having a cache-based hierarchical memory system.

2. Description of the Related Art

A large number of processing devices/systems that process data/instructions that are stored and/or retrieved from a memory are designed with a memory hierarchy that includes one or more levels of caches. With some of these devices/systems, the memory hierarchy is hardware coherent (i.e., coherency enforced by hardware design), while other devices/systems comprise non-coherent memory hierarchy. During conventional debugging operations involving such devices/systems where the cache(s) are not hardware coherent, the debugger has no non-intrusive, efficient way of determining which caches actually contain the cache line of data/instructions associated with the particular transaction address, and the debugger thus causes each cache controller to each perform a full scale address lookup within the respective cache to determine which caches contain the specific information associated with the transaction address. When performing debug operations that include updating the memory window of the debugger, the process for obtaining the required information about the caches within the memory hierarchy requires complex address lookups. If the debugger decides to bypass the complex lookup and read the cache directly, the debugger access is intrusive and can corrupt the entries within the cache. With these conventional methods, debugger modifications to memory (e.g., to install breakpoints, or modify memory) also take a significant length of time to return the requested information. Also, when the debugger wants to modify specific locations storing information associated with a specific transaction address, the debugger encounters the delays inherent with the conventional, full cache lookup mechanisms, slowing down the debug process.

BRIEF DESCRIPTION OF THE DRAWINGS

The described embodiments will best be understood by reference to the following detailed description of an illustrative embodiment when read in conjunction with the accompanying drawings, wherein.

DETAILED DESCRIPTION

Figure 1:
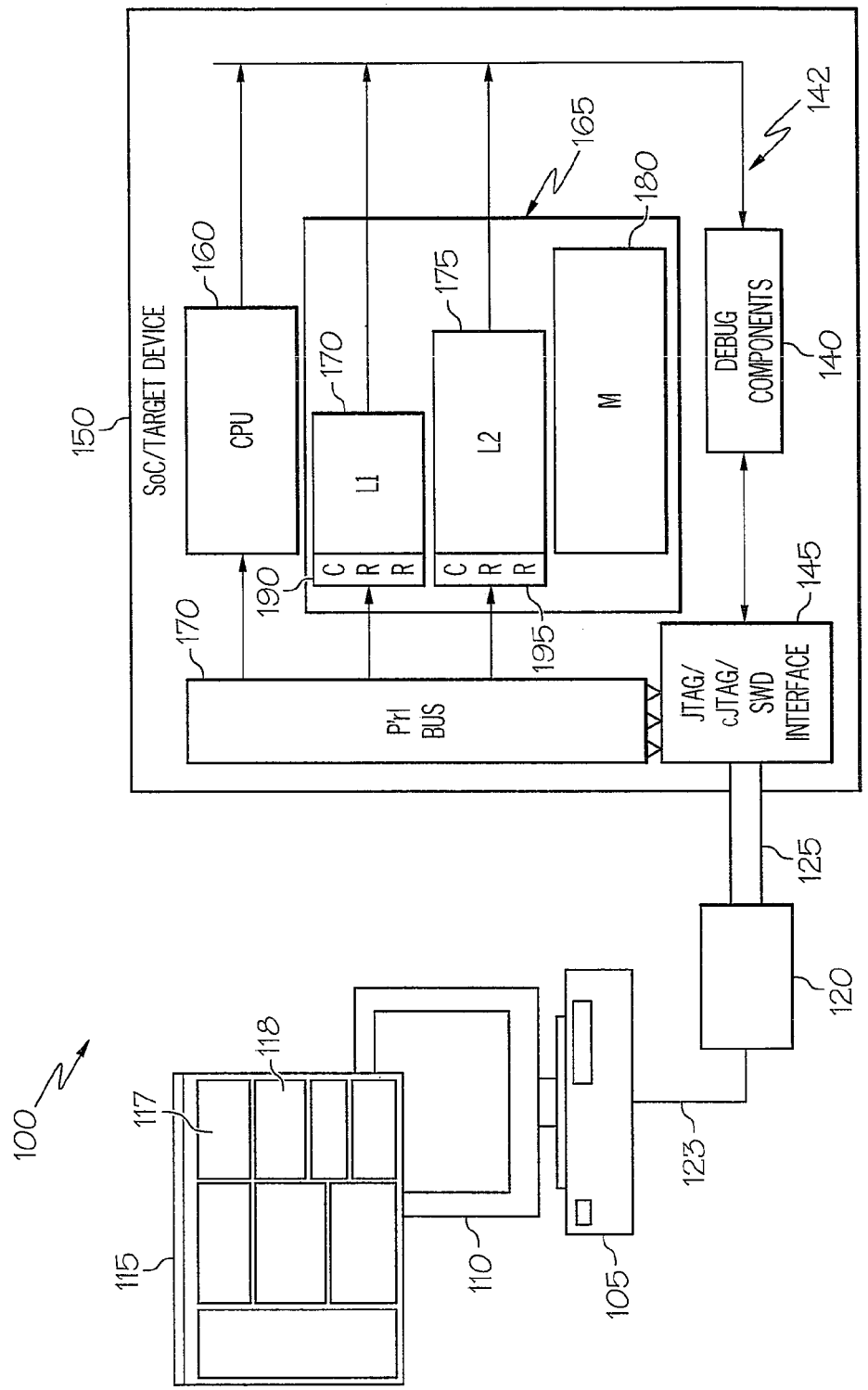
FIG. 1 illustrates an example debug system in which debugging of a target device having a hierarchical memory system is supported, according to one embodiment.

The illustrative embodiments provide a method and device that enables a software debugger executing on a data processing system connected to the (target) device to more efficiently perform debug operations involving the caches of the memory hierarchy. The device comprises: core logic (or one or more processor cores) which performs functional operations of the device; and a memory hierarchy including a memory and one or more levels of caches. Each level of cache within the memory hierarchy is configured with a cache results register (CRR). Each component at each level of the memory hierarchy is coupled to the processor core via both a system bus (for standard data operations) and via a peripheral bus (for configuration and debug operations). The device is placed in debug mode, and a debugger executing on a computer that is coupled to the device by a debug interface forwards a transaction address (TA) of interest to the debugger to the processor and request the processor complete a dummy transaction corresponding to the TA. On receipt of the TA, the device processor forwards the TA via the system bus to the memory hierarchy to initiate a cache access address lookup operation within each level of cache. The cache access address lookup operation determines whether the transaction address (TA) hits within the particular cache. For each cache in which the TA hits, the cache controller (debug) logic of that cache updates the cache's CRR with "cache access information" (i.e., Hit) that indicates whether the transaction address hits within the particular cache and stores the specific physical location within the memory at which the corresponding instruction/data is stored (i.e., Way, Index). For data caches, the CRR may also be updated with the dirty cache attribute. The cache controller logic then forwards the TA to the next level of the memory hierarchy. When the TA misses within the cache, the cache controller debug logic updates the Hit/Miss indicator (or Hit indictor) of the CRR to indicate that the TA missed.

In response to completion of the dummy transaction (e.g., by detecting return of the data from memory), the debug probe accesses each of the CRRs via the peripheral bus (rather than via the processor and system bus) to retrieve the value of the Hit indicator from each CRR. When the initial request was for an update to the memory window of the debugger, the cache controller logic forwards the Hit indicator value to a debugger interface connected to (or configured on) the device. The Hit indicator value for each cache is forwarded via the peripheral bus to the debugger interface and to the debug probe, which in turn forwards the Hit indictor value for each cache to the debugger. The debugger displays the actual data returned from the memory within a memory window of the debugger, along with a color coding or other identification method to indicate which caches within the memory hierarchy contain a copy of the data.

In one embodiment, when the debugger receives a request to update the stored information (instructions or data) corresponding to the physical location within the caches, the debug interface forwards the request via the peripheral bus to the controller logic of each cache. The debugger (or connected debug probe) checks the Hit indicator of the cache's CRR, and when a Hit is indicated, the debugger/debug probe retrieves the Way and Index values from the CRR and performs the update of the stored information at the specific location within each cache. The debug probe performs the cache update/access without having to perform another time-intensive cache address lookup within the various cache levels of the memory hierarchy. The debugger is thus able to access the specific cache locations storing instructions/data of relevance (corresponding to the TA) using the cache address information stored within the CRRs. In an alternate embodiment, the accesses to the data/instructions within the cache are performed by the cache controller (debug) logic.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Within the descriptions of the figures, similar elements are provided similar names and reference numerals as those of the previous figure(s). Where a later figure utilizes the element in a different context or with different functionality, the element can be provided a different leading numeral representative of the figure number. The specific numerals assigned to the elements are provided solely to aid in the description and not meant to imply any limitations (structural or functional or otherwise) on the described embodiment.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture with a single processor/processing node illustrated within a single, network-connected, data processing system. The illustrative and described embodiments assume that the system architecture may be scaled to a much larger number of processing nodes, as with a multiprocessor system and/or with a distributed computing system.

With reference now to the figures, and beginning with FIG. 1, there is depicted a system for debugging a target device that comprises a memory hierarchy in which each level of cache has an associated cache results register (CRR) to enable efficient memory access to specific locations within one or more caches. According to the described embodiment, the device does not provide hardware enforced coherency of the memory hierarchy, and thus, a data lookup can hit in any one of the cache levels independent of the other cache levels. The device also comprises a peripheral bus 170. As illustrated, the system 100 generally comprises a data processing system 105 coupled to a target device 150 via an external debug probe 120 and a debug connector interface/mechanism/port 145. The debug probe 120 enables translation and communication of debug session information between a debugger executing on the data processing system (DPS) 105 and the target device 150. The debugger performs some of the accesses to the respective CRR 172/177 via the debug probe 120 connected between the debugger system and the target device 150. The debugger has access to the peripheral bus 170 directly from the debug interface 145 (which in the illustrative embodiment is a JTAG interface and includes a JTAG to peripheral bus adapter) without having to go through the central processing unit (CPU) 165 or processor. The debugger thus only utilizes the processor to perform an access on the system bus (see FIG. 4). Each of the two primary components (DPS 105 and device 150) is configured with (or comprises) a plurality of sub-components, some of which are also illustrated and described herein. More detail illustrations of each primary component are provided in the remaining system figures (FIGS. 2-6).

Figure 2:
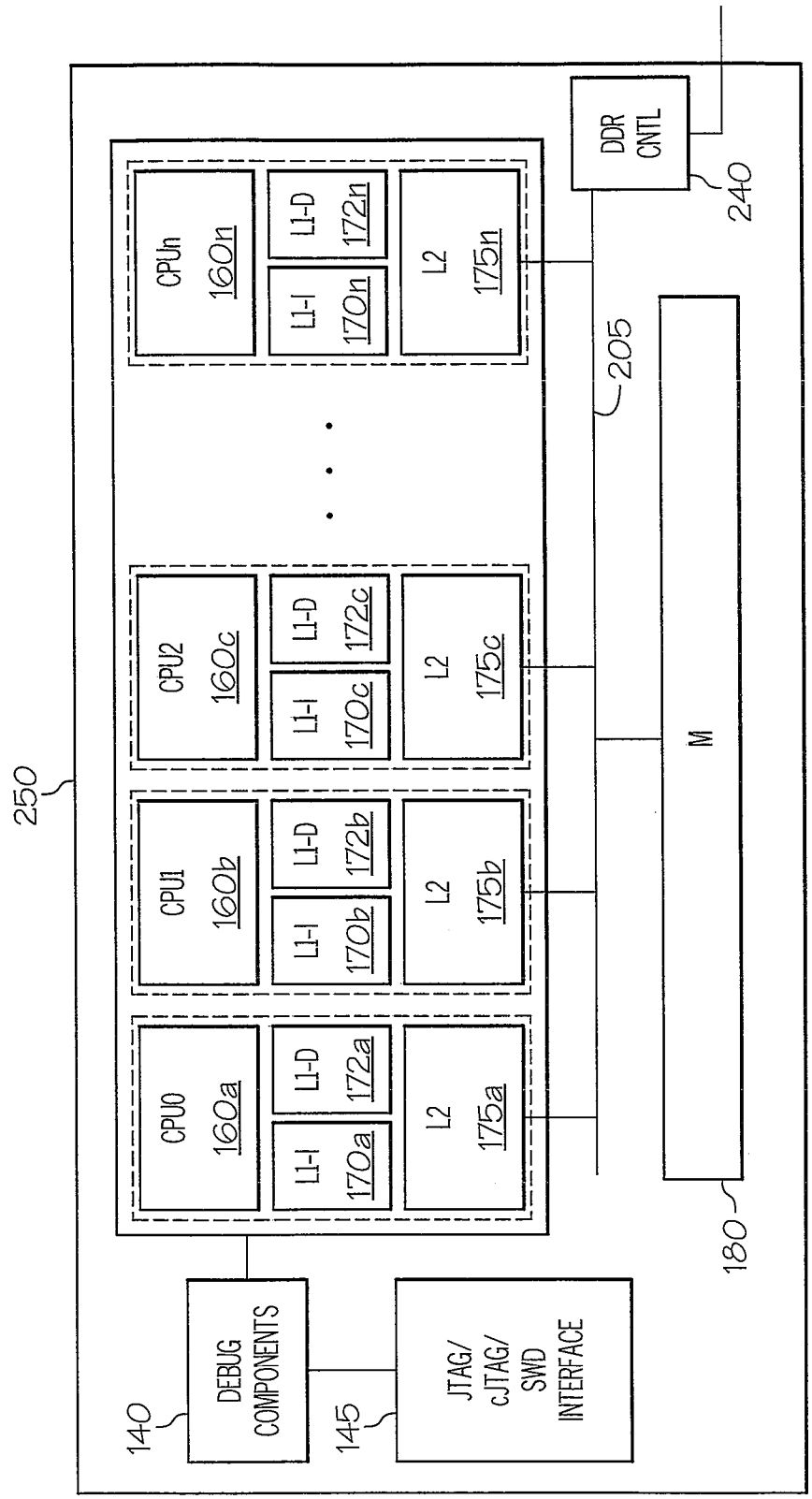
FIG. 2 illustrates an example target device with multiple processor cores and a cache hierarchy having unshared caches, according to one embodiment.
Figure 3:
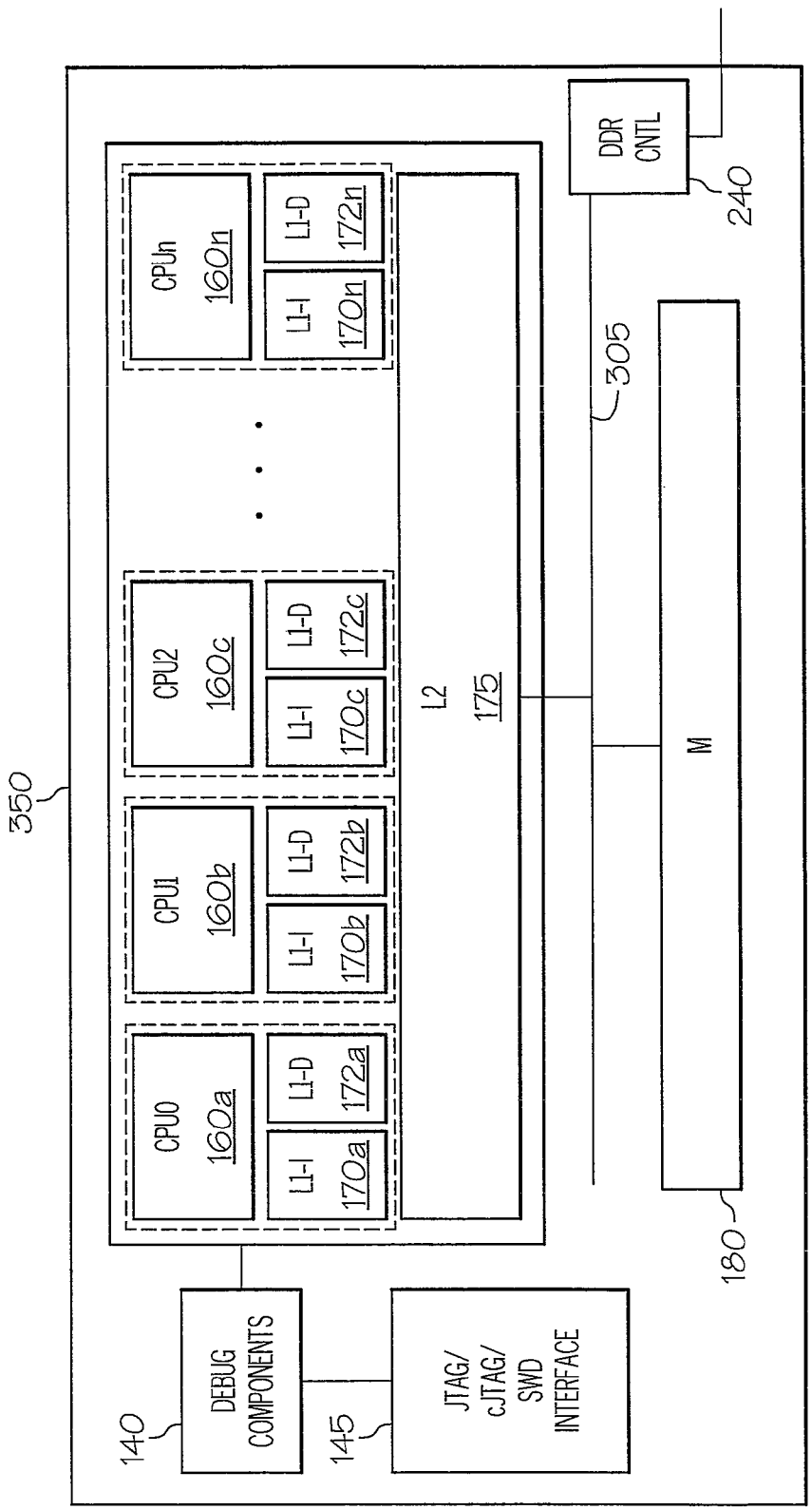
FIG. 3 illustrates an example target device with multiple processor cores and a cache hierarchy having a shared L2 cache, according to one embodiment.
Figure 4:
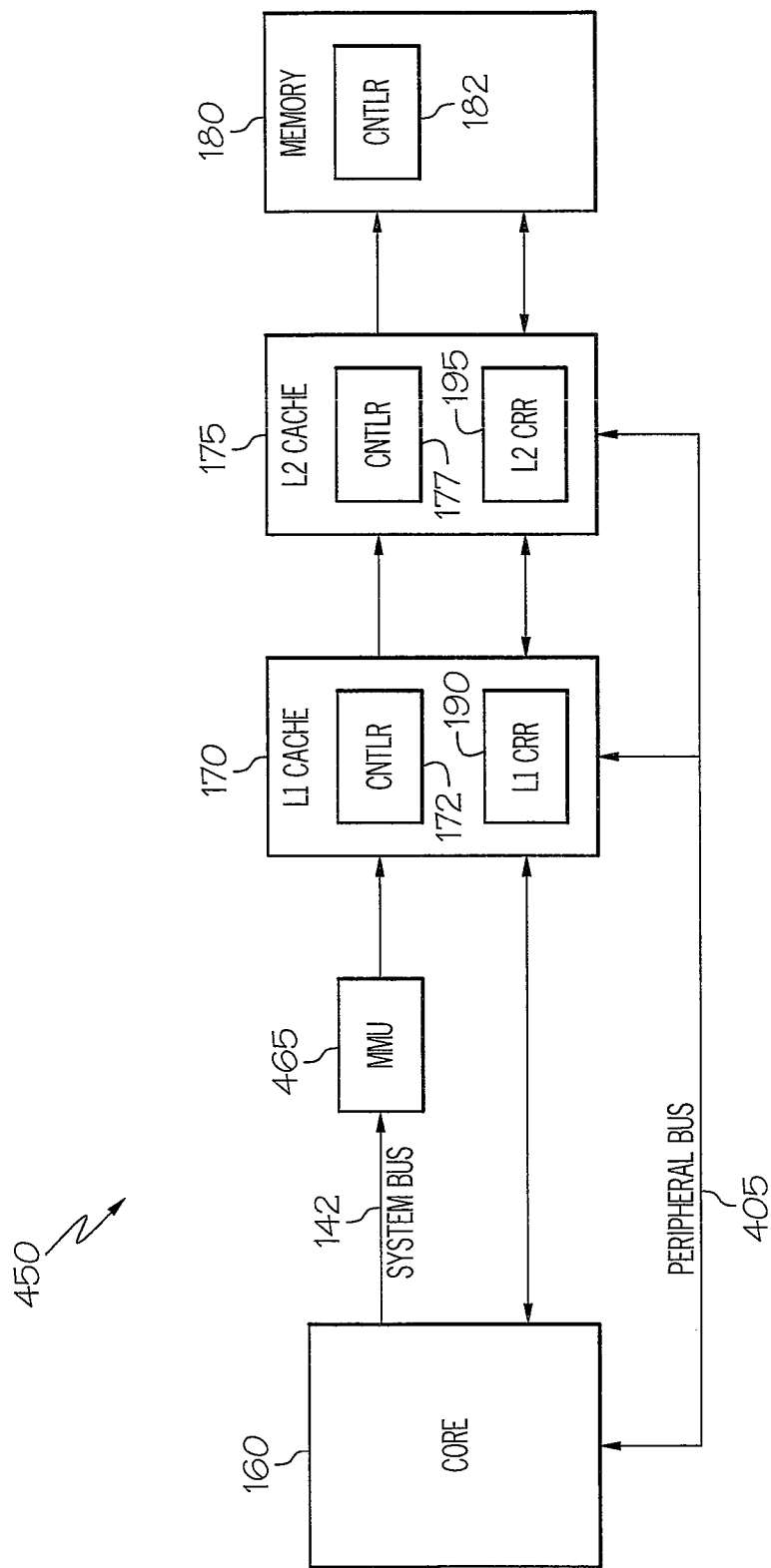
FIG. 4 is a block diagram representation of a target device showing the CRRs and the connectivity to a peripheral bus, according to one embodiment.

As illustrated within FIG. 1 and also presented by FIGS. 2-4, target device 150 comprises a plurality of functional components, including a processor core 160 (or multiple cores in a multi-core device) that processes operations of the target device and a memory hierarchy 165 that includes one or more (two illustrated) levels of caches. At least a first level (L1 cache) of the memory hierarchy 165 is coupled to the processor core 160. Target device 150 also includes a set of debug components 140 that record debug data and/or facilitates debugging during operation of the target device, and in which debug data and/or state information are stored as the target device is taken through a debug session/operation. Target device 150 further comprises a debug communication interface 145 (or debug interface 145), which is indicated as one of a JTAG, cJTAG, or SWD interface. Debug interface 145 enables target device to exchange communications with an external device (e.g., data processing system 105) or processing module (e.g., debugger) via a debug probe 120, as shown.

According to the embodiments presented herein, memory hierarchy 165 of target device 150 comprises an L1 (level one) cache 170, L2 (level two) cache and memory (M3) 180. Each of L1 cache 170 and L2 cache 175 includes an associated cache results register (CRR) 190 and CRR 195, respectively. CRR 190 and CRR 195 are hardware registers that are built or embedded on L1 cache 170 and L2 cache 175, respectively, of target device 150. Each CRR captures local cache access information indicating whether or not a specific transaction address hits within the particular cache and provides the specific way and index for the physical location (e.g., cache line) within the random access memory (RAM) of that cache in which the data/instructions associated with the specific TA are/is stored. The CRR (190/195) can also be utilized to access the specific cache location to perform updates to the information stored within the cache. As further provided by FIG. 1, in one embodiment, CRR 190/195 connects (via one or more peripheral/debug buses) to communication/JTAG interface 145, which provides access by debugger probe 120 to target device 150.

As further provided by FIG. 1, the connection between DPS 105 executing debugger and target device 150 comprises a communication converter module/port, which is generally referred to as debug probe 120. In the illustrated embodiment, debug connector 120 is respectively coupled between the DPS 105 (debugger) and the communication interface 145 of target device 150 via an input output (I/O) connector 123 and a serial cable 125. Any one of a number of different types of debug probes can be provided in the various embodiments.

DPS 105 is illustrated having a display device 110 associated therewith. Presented on display 110 is an example debug graphical user interface (GUI) 115, which is generated by the debugger executing on DPS 105. A memory window 117 and a cache viewer 118 are illustrated as being present within debug GUI 115. Generally, DPS 105 comprises a processor, a memory, and debugger code executing on the processor, and DPS 105 provides the debugger, which generates specific test conditions/requests for forwarding to the target device 150. Functional components of the example DPS 105 of FIG. 1 are presented in greater detail in the description of FIG. 6 herein.

As presented herein, the memory window 117 shows the data value for each transaction address (TA) and possibly many such TAs. The data value may reside in any of the caches or memory (with specific locations determined following the dummy read from each CPU and a follow up read of each cache's CRR). The Hit value of the CRR can thus be utilized to show within the memory window which cache the data is located in. In one implementation of debugger, the data value can be colored to indicate which cache (or memory) within the memory hierarchy the data was retrieved from.

As also presented herein, the cache viewer 118 is a window within the debugger user interface that is utilized specifically for viewing the cache contents from the cache perspective to show what data is in the particular cache and the location of that data within the cache. Thus, in the described embodiments, the cache viewer may actually show the TA, WAY, INDEX, and the actual data value.

When the debugger (or user of the debugger) attempts to change one of the data values, the debugger ensures that an equivalent update is performed for each location of the memory hierarchy holding the data. The debugger utilizes the CRR values from each cache and writes the data value to each cache of an associated CRR that indicates a hit of the transaction address within that cache.

One embodiment provides the debugger with the ability to install breakpoints. Similar to the memory window (writes), the debugger has to determine in which caches the transaction address resides in and the debugger performs an update to every instance when the breakpoint is written/installed. Thus, for caches in which the TA hits, the debugger (debug probe) utilizes the WAY and INDEX values from the cache's CRR to make a copy of the instruction and install the breakpoint in place of the instruction.

Additional configuration and functionality of the memory hierarchy of target device 150 is illustrated by FIGS. 2 and 3, which respectively provide target device 250/350 in which each memory hierarchy has both one or more L1 caches and an L2 cache. In both FIGS. 2 and 3, target device 250/350 is illustrated with multiple processor cores 160 (including, for example, CPU0 160a . . . CPUn 160n, where n is an integer number. Both devices 250/350 also comprises bi-furcated L1 caches, specifically separate L1 Instruction (L1-I) caches 170 (e.g., L1-I cache 170a . . . 170n) and L1 data (L1-D) caches 172 (e.g., L1-D cache 172a . . . 172n). In FIG. 2, target device 250 comprises separate L2 caches 175a . . . 175n for each processor core, while target device 350 of FIG. 3 comprises a single shared L2 cache 175. The highest level of the memory hierarchy within each target device 250/350 is level 3 and is represented by system memory (M) 180, which is shared. Within each target device, normal access to system memory is via a system interconnect or bus 205/305, which connects the processor chip (s), illustrated with dashed lines, to the memory 180. As illustrated by FIGS. 2 and 3, the third level of the memory hierarchy may include off-device memory, such as a double data rate (DDR) random access memory (RAM) (not shown), that is external to the device 150 and which is controlled/accessible via DDR controller 240 connected to the system bus 205/305.

The functional aspects of the described embodiment can be implemented within a device configured with a single processor having a single memory hierarchy, and the embodiments are generally described from that perspective. However, as introduced with the above multi-processor configuration of FIGS. 2 and 3, the embodiments are fully applicable to alternate device topologies, including the illustrated and described multi-processor topology in which each processor core has a separate memory hierarchy, with a shared single memory (or distributed memory) provided as the highest level within the memory hierarchy on the local device.

Figure 5:
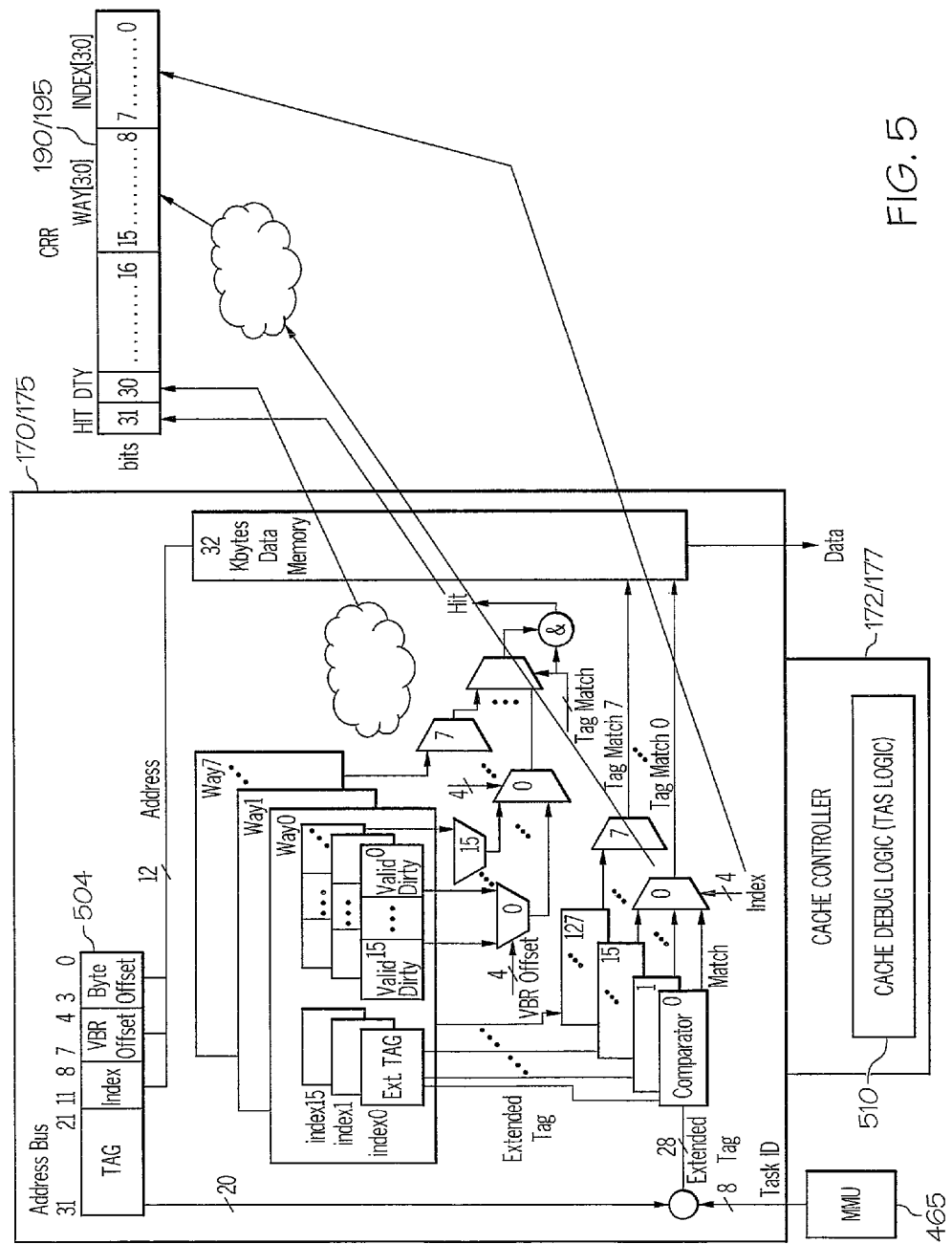
FIG. 5 is a block diagram representation of (internal) transaction address logic of an example cache, according to one embodiment.

FIGS. 2 and 3 show general configuration of the caches relative to the processor cores and memory. Additional components that are not illustrated by these two figures, and which are assumed to be included within the general presentation of the caches and memory, include cache controller logic and CRR, both associated with each of the caches, and a memory controller associated with memory 180. FIGS. 1, 4 and 5 provide configurations illustrating the CRRs, while FIGS. 4 and 5 illustrate the controller logic associated with each cache. Turning now to FIG. 4, there is illustrated a block diagram representation of target device 450 showing the CRRs within the various caches as well as the connectivity (for data/instruction communication) between the core and the different components of the memory hierarchy. Target device 450 is similarly configured as target device 150 (FIG. 1). Target device 450 comprises processor core 160 and a memory hierarchy that includes L1 cache 170, L2 cache 175 and memory 180. CRR 190 is illustrated (embedded) within L1 cache 170 is, while CRR 195 is illustrated embedded within L2 cache 175. Also included in target device 450 is memory management unit (MMU) 465, coupled between processor core 160 and L1 cache 170. As shown, MMU 465 is connected via address buses 142 between processor core 160 and L1 cache 170. The specific location of MMU 465, as well as the location of L1 cache and L2 cache relative to the processor core and (e.g., on chip or off chip) is not germane to the description. Thus, the present configuration is provided only for illustration and not intended to be limiting on the invention. During debug operations, MMU 465 receives a virtual address of a dummy transaction from processor core 160 (triggered by the debugger) and MMU 465 translates the received virtual address into a physical address (transaction address) corresponding to a memory location targeted by the dummy transaction.

Communication between the various components of target device 450 is enabled via a bi-furcated system bus 142 (comprising address bus and data bus) and/or a peripheral bus 405. As shown, system bus 142 comprises an omni-directional instruction (address) bus and a bi-directional data bus. Peripheral bus 405 provides a direct connection between processor core 160 and each cache of the memory hierarchy, and peripheral bus 405 enables efficient cache-directed debug processing, as described herein. In one embodiment, peripheral bus 405 enables debug probe 120 to (a) obtain hit/miss information from cache access information contained within CRR 190 of L1 cache 170 and CRR 195 of L2 cache 175 and (b) perform an access to the physical location within a random access memory (RAM) of the corresponding cache utilizing the way indicator value and the index value from the cache access information contained within the respective CRR.

As further illustrated by FIG. 4, access to each cache and to the memory of target device 450 is controlled by a respective controller. According to the described embodiments, cache controller 172/177 provides transaction address processing logic for enabling access to and updates within the particular cache 170/175. Likewise, memory controller 182 controls access to the memory 180. As further illustrated by FIG. 5, each cache controller 172/177 further comprises cache debug logic (or transaction address searching, TAS, logic) 510, which controls access to the CRRs as well as other functionality associated with the debug operations that can be triggered/performed within the particular cache. Processing by cache controller 172/177 of transactions/operations within the cache involves receipt by the cache controller 172/177 of a transaction address from the processor core or a higher level cache. The received transaction address points to specific data/instruction that can either be located within the particular cache (i.e., a cache hit) or alternatively may not be located within the particular cache (i.e., a cache miss). The determination of a cache hit or miss is based on a comparison of the transaction address with the addresses for all cache lines stored within a particular cache. Within a cache configured with RAMs, the cache lines are stored in particular ways, with each way having an index.

FIG. 5 illustrates a block diagram representation of internal cache logic, according to one embodiment. FIG. 5 can represent both/either L1 cache 170 and L2 cache 175, and is described generically as being a cache that can be an L1 cache as well as an L2 cache. The functional configuration/structure of the cache 170/175 is assumed to be known to those skilled in the art and thus no specific description is provided of the illustrated internal cache structure. During debug operation (i.e., while the device is in debug mode), cache 170/175 receives a transaction address 504 from MMU 465 of a dummy transaction (generated by processor and/or triggered by debugger). In response to receipt of the transaction address of the dummy transaction from processor core 160 via MMU 465 while the cache 170/175 is in debug mode, cache controller logic (172/177) processes the transaction address to first determine if the address of the dummy transaction hits within the cache. In particular, the transaction address provided by processor core 160 is compared with the address included in the cache tag within each way for each index of the cache. In response to a hit of the transaction address of the dummy transaction within the cache, the cache debug logic automatically updates a first entry of CRR 190/195 with the hit/miss information. According to the described embodiments, the CRR hit/miss indictor value is defaulted to indicate a miss (e.g., logic 0) until a hit occurs with a transaction address from a dummy transaction (while in debug mode). In one embodiment, when a miss occurs, the Hit/Miss indicator value of the CRR is automatically updated to reflect a Miss (as the default "miss" value may have been changed during previous debugging operations). However, when a hit occurs, the hit/miss indicator value is updated to indicate a hit within the cache (e.g., logic 1). When a hit occurs, additional cache access information (e.g., a Way and Index of the data/instruction corresponding to the transaction address within the cache) is retrieved from the cache and passed to update the CRR 190/195. In one embodiment, the entire set of cache access information is latched to the particular CRR 190/195 of the cache. Once the processing of the transaction address completes within the particular cache, the cache controller 172/177 passes the transaction address down to a next level of the memory hierarchy (i.e., from L1 cache 170 to L2 cache 175, then to memory). Thus, in response to a miss of the transaction address of the dummy transaction within the cache, the cache debug logic 510 updates the Hit/Miss indicator of the CRR and passes the transaction address down to a next level of the memory hierarchy. In an alternate embodiment, where the CRR is defaulted and reset to a miss value on start up of the debug session, the cache debug logic 510 can pass the transaction address to the next level of the memory hierarchy, without updating the CRR of the present cache. In one embodiment, the CRR 190/195 is defaulted by the debugger and/or cache debug logic 510 to indicate a miss when the device enters debug mode, and the CRR 190/195 can be reset by the cache debug logic 510 prior to any new debug operation that requires resetting of the CRRs for the debug operation to yield a correct result.

The location of CRR relative to the other components of the cache is not an important consideration within the description, and the location can be a design/configuration parameter for the specific device and/or specific cache. Additionally, CRR 190/195 can be any dimension, so long as CRR is capable of holding the largest values of Way, Index, and Hit/Miss indicator possible within the cache. As provided in FIG. 5, CRR 190/195 is a 32 bit register with (a) a first pre-set number of bits (e.g., eight bits: bits 0 to 7) assigned to store the way indicator value corresponding to a physical location of information (data or instruction) corresponding to a transaction address that hits within the cache, (b) a second pre-set number of bits (e.g., eight bits: bits 8 to 15) assigned to store the index value corresponding to the physical space within the specific way of the cache, and (c) a third pre-set bit(s) (e.g., bit 31) assigned to store the hit/miss indicator. With a single bit hit/miss indicator, a first value (e.g., a logic "1") of the third pre-set bit indicates a cache hit and a second value (e.g., a logic "0") of the third pre-set bit indicates a cache miss. The arrows presented within the figure merely illustrate general locations corresponding to the hit/miss indicator (from address comparator logic), way and index values that are latched within the CRR 190/195. Additionally, for each data cache, the CRR is also utilized to latch/capture the dirty bit value within a dirty bit indicator (illustrates as bit 30 of CRR 190/195) when the data location is dirty. The dirty bit value is also forwarded to the cache viewer (118) when the CRR's cache access information is retrieved by a subsequent debugger request for information to present within the cache viewer. As utilized herein, dirty data refers to a data value that has been updated in the cache, but not yet updated in main memory. Dirty data will be pushed out to main memory when the data location is evicted from the cache and/or the dirty data could be in the process of being pushed out to memory, but is still stuck in a write buffer.

Figure 6:
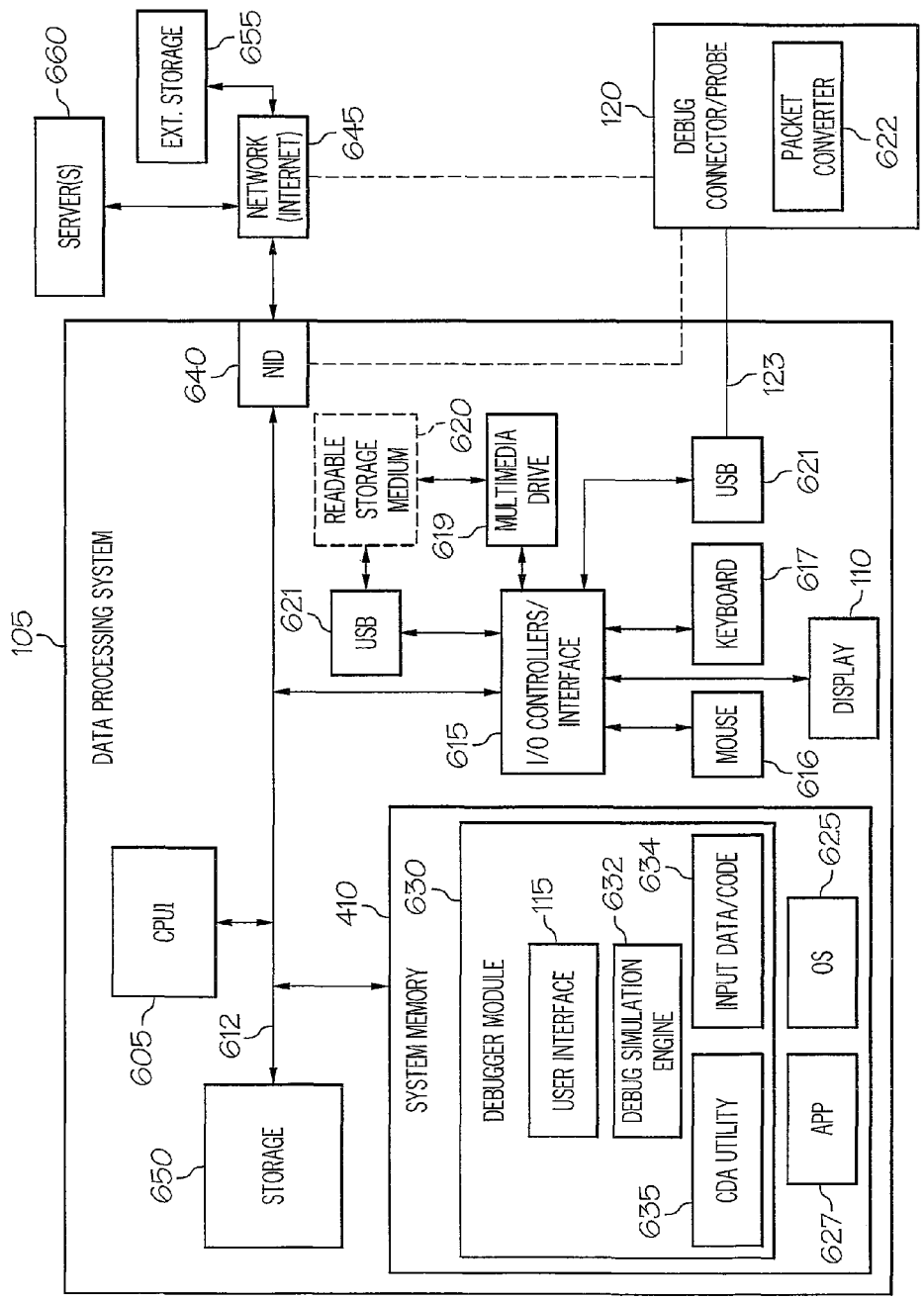
FIG. 6 is a block diagram representation of an example data processing system (DPS) that operates as a debugger, according to one embodiment.

FIG. 6 illustrates a block diagram representation of an example data processing system (DPS), adapted with software modules that enable completion of one or more of the methods described herein, in accordance with one or more embodiments. DPS 105 may be a server, a personal computer, a portable device, and/or other types of electronic devices that may generally be considered data processing devices and which are capable of executing a debugger application/utility. As illustrated, DPS 105 comprises one or more processors (or central processing unit (CPU)) 605 connected to system memory 610 via system interconnect/bus 612. Also connected to system bus 612 are one or more Input/output (I/O) controllers/interfaces 615, which provide connectivity and control for input devices, of which a pointing device (or mouse) 616 and keyboard 617 are illustrated. I/O controllers/interfaces 615 can also provide connectivity and control for output devices, of which display (monitor) 610 is illustrated. Additionally, a multimedia drive 619 (e.g., compact disk read/write (CDRW) or digital video disk (DVD) drive) and USB (universal serial bus) port 620 can be coupled to respective I/O controllers/interfaces 615. Multimedia drive 619 or USB port 621 or other serial port enable insertion/connection of one or more readable storage mediums 620 (e.g., optical disk or thumb drive) on which data and/or program instructions/code may be stored (or embedded) and/or from which data and/or program instructions/code may be retrieved. DPS 105 also comprises non-volatile system storage 650 coupled via a corresponding storage adapter (not shown). System storage 650 may store data and/or program instructions/code, including data specific to the implementation of the debug operations of one or more target devices.

To enable communication with external networked components, DPS 105 further comprises one or more network interface device(s) 640, by which DPS 105 can connect to one or more network accessible devices, such as external storage 655 or server(s) 660. Access to these devices is enabled via one or more networks 645. Network interface 640 may be configured to operate via wired and/or wireless connection to an access point of the network 645. Network 645 may be an external network such as the Internet or wide area network (WAN), or an internal network such as an Ethernet (local area network—LAN) or a Virtual Private Network (VPN). When network 645 is an internal network, such as a LAN, connection to the external network (e.g., Internet) may be established with one or more servers (660). In one embodiment, servers 660 may also provide data and/or program instructions/code for use by or execution on DPS 105. In one or more embodiments, access to external storage 655 may also be via a storage adapter (not shown), which may maintain a communication or (data transfer) link, such as a fiber channel link, to external storage 655. External storage can include one or more storage repositories containing data that is stored and/or accessed during processing of the various methods described herein. The data can be accessed by DPS 105 and downloaded and stored on local storage 650 or within system memory 610 for utilization with local processing.

In one implementation, DPS 105 can connect to a debug probe 120 via one or more of a USB connector (621), an Ethernet adapter (not specifically shown, but assumed to be included within NID 640) or a network (645). The possible alternative connection methods between debug interface 120 to DPS 105 via a network adapter or via a network are illustrated as dashed connection lines representing cables connecting to the debug probe 120. Debug probe 120 enables debugger (module) 630 to connect to and trigger or control execution of one or more debug sessions on a connected target device. Debug probe 120 is also utilized to access the CRR and retrieve cache access information therefrom. Debug probe 120 can also be utilized to perform access to the specific physical location in which the data/instruction of interest is stored within the cache(s). Debug probe 120 includes packet converter module/utility that enables conversion of received packets from the DPS 105 into a protocol that is understood by target device 150. It is appreciated that the connection of the debug probe 120 to DPS 105 can be via a standard USB or serial port when the debug probe 120 is locally connected. Alternatively, in another embodiment, the DPS 105 and debug probe 120 can be communicatively connected via a network interface when the DPS 105 that is executing the debugger 630 is not physically located in a same location (i.e., is geographically separated) as the debug probe 120.

Those of ordinary skill in the art will appreciate that the hardware components and basic configuration depicted in FIG. 6 may vary. The illustrative components within DPS 105 are not intended to be exhaustive, but rather are representative to highlight essential components that are utilized to implement the present invention. For example, different configurations of data processing devices/systems may be utilized containing other devices/components, which may be used in addition to or in place of the hardware depicted. The depicted example is not meant to imply architectural or other limitations with respect to the presently described embodiments and/or the general invention. The data processing system depicted in FIG. 6 may be any processing device capable of supporting the debug features described herein.

In addition to the above described hardware components of DPS 105, various features of the invention are completed/supported via one or more executable program code or software modules (or firmware) and data loaded into system memory 610 from one or more non-volatile storage (e.g., local system storage 650 or external storage 655). During implementation of one or more of the methods of the described embodiments, the one or more program code or software modules are executed by CPU 605 or, in alternate embodiments, by some other instruction execution mechanism associated with DPS. Thus, for example, illustrated within system memory 610 are a number of software/firmware/logic components, including operating system (OS) 625 (e.g., Microsoft Windows®, a trademark of Microsoft Corp, or GNU®/Linux®, registered trademarks of the Free Software Foundation and The Linux Mark Institute, or Advanced Interactive Executive (AIX), a registered trademark of International Business Machines). One or more applications 627 are also shown within system memory 610, and these applications may be utilized within the debug process or may be independent of the debug process.

Also included within system memory 610 is debugger module (or debugger) 630, which comprises a plurality of functional modules and/or data, including debug simulation engine 632, debug input data/code 634, and CRR debug access/interfacing (CDA) utility 635. Debugger 630 also comprises user interface 115, which includes a memory window 117 (FIG. 1). CDA utility 635 may be provided as an add-on enhancement to an existing debugger in order to support debugging of devices that are designed with caches configured with a CRR and the specific cache debug logic that supports various debugging operations of the target device. In one embodiment, specific functional features of CDA utility 635 can be triggered via programming of those functions within debug connector 120. With this embodiment, certain aspects related to the interfacing with the CRRs 190/195, including responding to a request for current cache information of a particular transaction address by triggering a detection/retrieval of current values of each CRR and forwarding that retrieved information to debugger to populate a memory window of the debugger, can alternatively be completed by programmed functionality of debug probe 120.

In one embodiment, certain features associated with CDA utility 635 and/or CDA utility 635 itself may be available via a software deploying server (e.g., server 660), and DPS 105 communicates with the software deploying server (660) via network 645 using network interface 640. Then, CDA utility 635 may be deployed from/on/across the network, via software deploying server 660. With this configuration, software deploying server (660) can perform certain of the functions associated with the execution of CDA utility 635, in one embodiment. Alternatively, software deploying server 660 is configured to enable DPS 105 to download the executable code required to implement the various features of the CDA utility 635.

During execution of debugger 630, the functions of CDA utility 635 are performed in a seamless/integrated manner with the other debug operations, such that debugger 630 presents as a single, cohesive component, which provides/supports the CDA debug functionality of CDA utility 635. For simplicity, references to the functions and/or features provided/supported by CDA utility 635 will hereafter be simply referred to as functions performed by and/or features of debugger 630.

In the described embodiments, CPU 605 executes debugger 630 (and/or CDA utility 635), as well as or in conjunction with OS 625, and debugger 630 enables DPS 105 to perform certain functions when specific code segments of debugger 630 (related to CDA utility 635) are processed by CPU 605. Among the program code/instructions or processing logic provided by debugger 630, and which are specific to the invention, are code/logic that when executed by the processor/CPU 605 enable DPS 105 and/or debugger 630 to perform the functions of: (a) initiating a debug mode for the device, which sets a processor core and components of a memory hierarchy having a one or more levels of cache and a memory in debug mode; (b) forwarding to the device, while the device is in the debug mode, a dummy transaction having a transaction address that triggers a cache access operation within each level of cache to determine whether the transaction address hits within a particular cache; and (c) in response to completion of the dummy transaction within the device, triggering a debug probe coupled to the device to retrieve hit/miss information from the CRR and updating a memory window of the debugger with a copy of the data returned from the dummy transaction and hit/miss information corresponding to the dummy transaction for each cache within the memory hierarchy. In one embodiment, the code/logic further enables the debugger to trigger the debug probed to: (d) responsive to a request to access the data stored in the physical storage location, detecting from each CRR of each cache (e.g., via the cache debug logic of the cache controller) whether the transaction address from the dummy transaction hit within the particular cache, and in response to the transaction address having hit within the particular cache, retrieving a way indicator value and an index value from the CRR and performing an access to the specific physical storage location within the cache indicated by the way indicator value and the index value at which the information is located within the particular cache. According to the described embodiments, forwarding of the dummy transaction while the device is in debug mode further triggers each cache to update a cache result register (CRR) of the particular cache with cache access information that indicates whether the transaction address hits within the particular cache, and when the transaction address hits within the particular cache, further indicates a way and an index at which the information corresponding to the transaction address is located within the particular cache.

As previously stated, the above and additional features and/or functions of the debugger 630 are provided as the debugger 630 executes within the DPS 105 of FIG. 6, which is provided within the system 100 of FIG. 1. Other features/functions provided by execution of debugger 630 on DPS 105 are described with reference to the flow chart of FIG. 7, which is described below. Among these additional features are features related to a computer implemented method for debugging, via a debugger application, a device configured with one or more levels of caches, where each cache includes a CRR, which are communicatively accessible (via the device processor and/or JTAG interface) to the debugger application. As provided within one embodiment, the method comprises: receiving a request to update a memory window or a cache viewer of the debugger with cache information (i.e., hit and/or location) for a data returned by a dummy read transaction; and responding to the request by issuing a first type debug request to the device, which request triggers the processor core to access the CRR of each level of cache and return hit/miss and way and index values contained within each respective CRR. Then, in response to receipt of the hit/miss and way and index values from the respective CRRs, the method comprises: updating the cache viewer of the debugger with the information received. The updating provides information about which levels of the memory hierarchy contains a copy of the data and further provides the specific way and index location at which the data resides within each cache containing a copy of the data. The specific HIT, WAY, INDEX information for each cache can thus be presented within a cache viewer of the debugger.

As introduced above, the target device is coupled via a debug probe to the data processing system on which the debugger application executes. In one embodiment, the debug probe is a JTAG probe. In another embodiment, the debugger request can be a request for the data when the dirty bit indicator indicates that the data in a particular cache is dirty. Then, in response to receipt by the debug probe of a request for data corresponding to the transaction address, the method comprises: the debug interface retrieving data from each cache containing the transaction address (indicated by a hit within the CRR) and for which the dirty bit indicator indicates the data is dirty; and presenting the retrieved data to the debugger for display within a window of the debugger. Also, in one implementation, retrieved data displayed within the memory window of the debugger can be color coded to indicate which cache the data was retrieved from.

In one embodiment, as illustrated by FIG. 5, the CRR also comprises a dirty bit indicator, which indicates whether the data within the cache line is in a dirty state (i.e., has been recently updated, but not yet returned to memory). Such information can also be presented to the cache viewer and/or the memory window of the debugger, in one embodiment.

Figure 7:
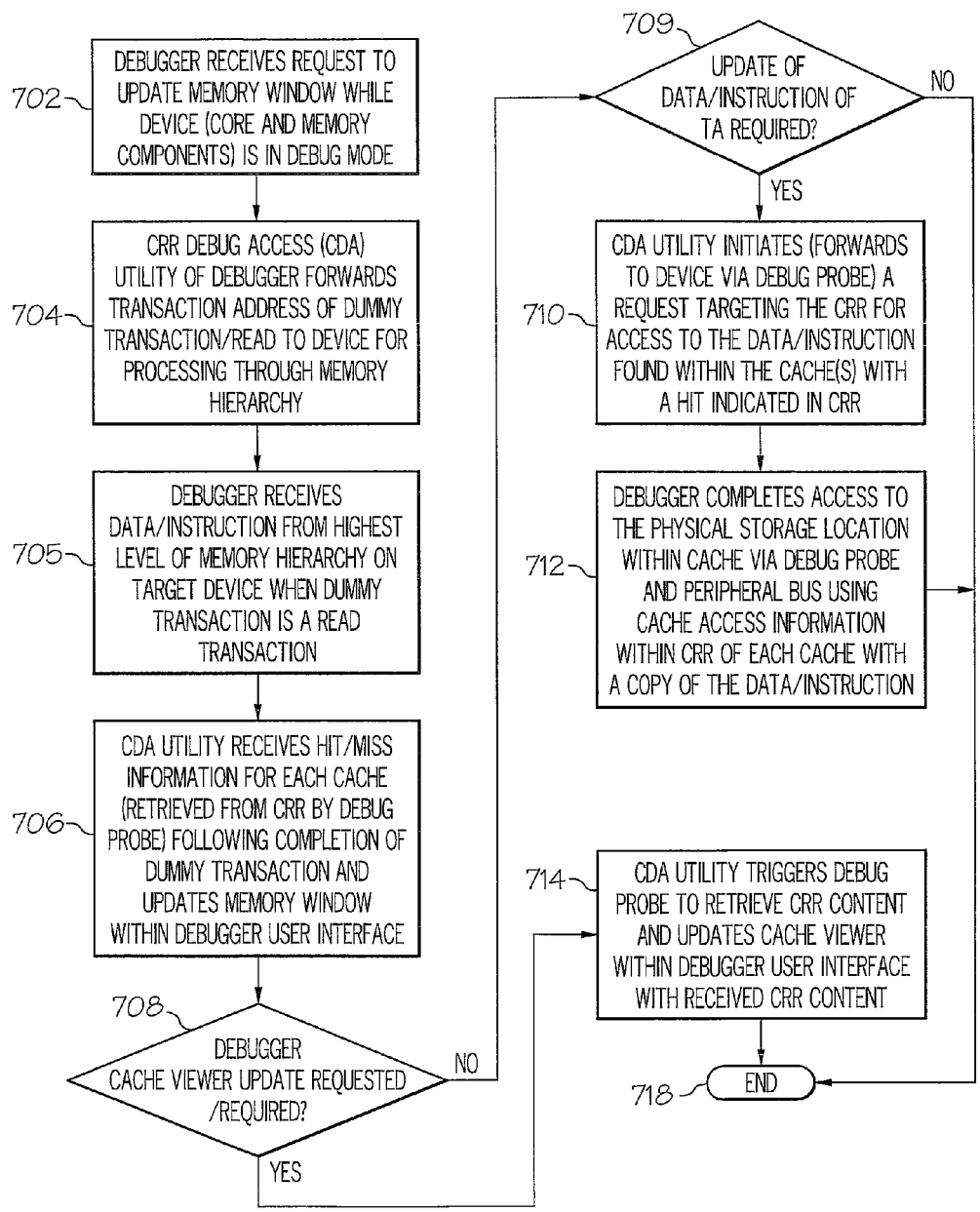
FIG. 7 is a flow chart illustrating the computer implemented method by which a debugger provides debugging functionality that enables debugging of a target device configured with caches having respective cache result registers (CRRs), according to one embodiment.
Figure 8:
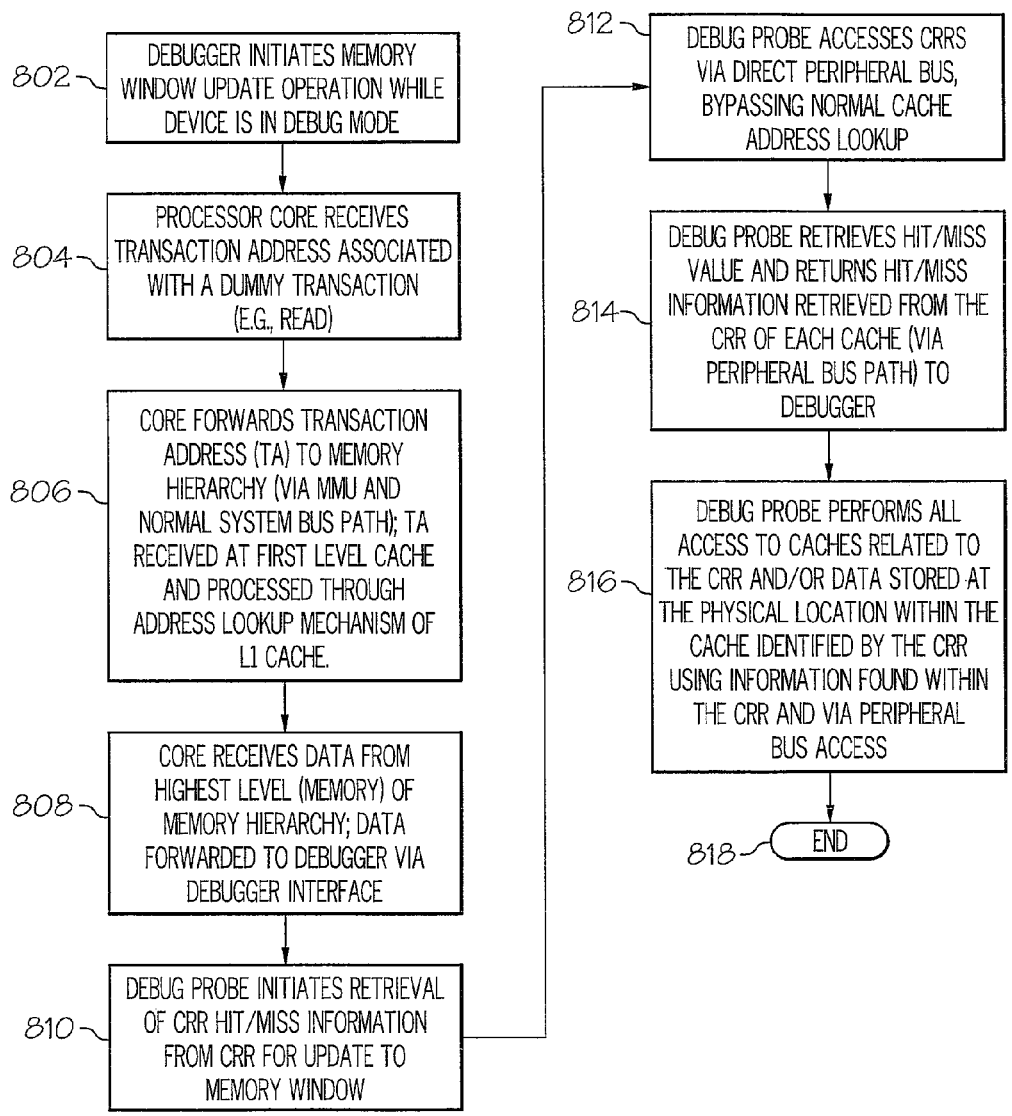
FIG. 8 is a flow chart illustrating the processor implemented method of processing received debug requests involving dummy transactions targeting a memory hierarchy that is designed with caches, which each has a CRR, according to one embodiment.
Figure 9:
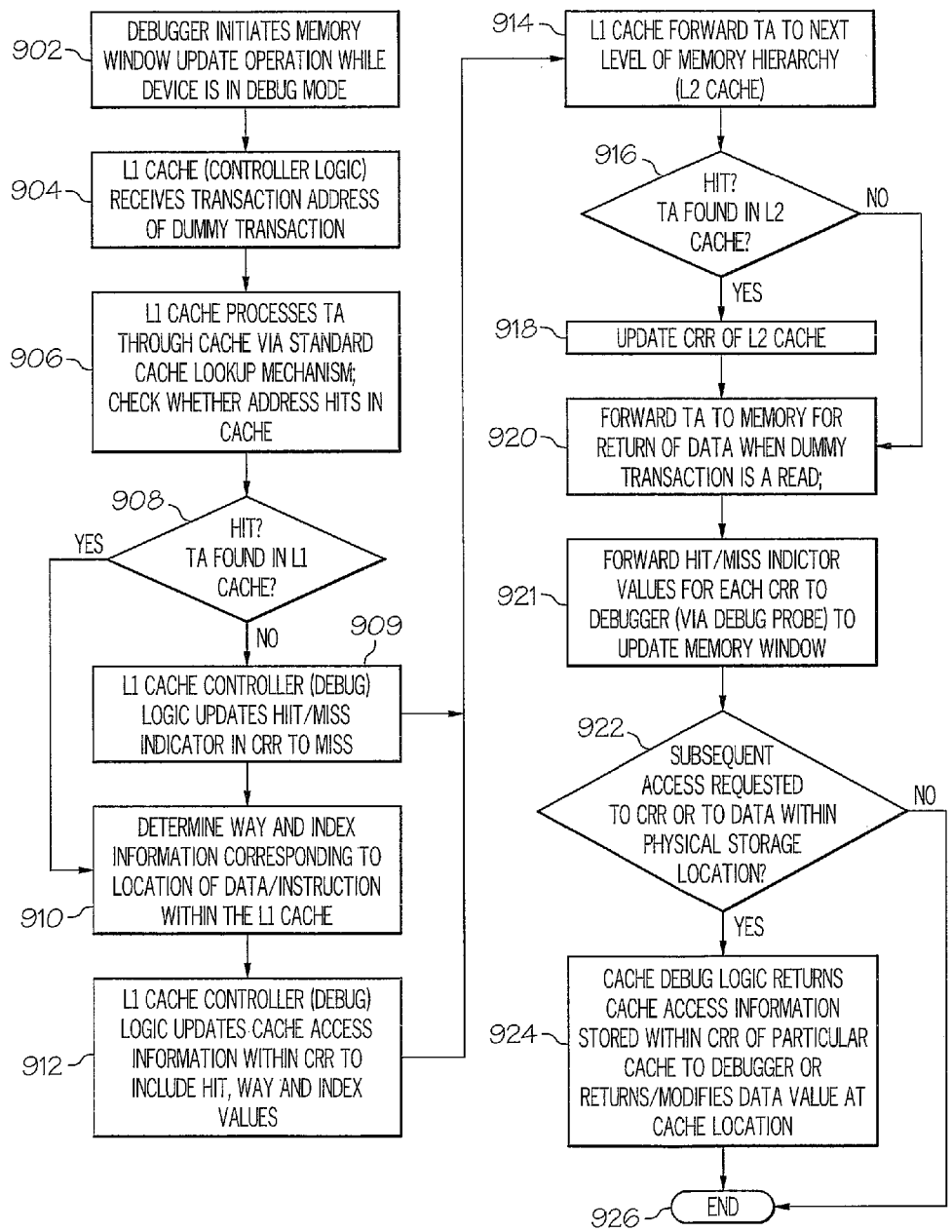
FIG. 9 is a flow chart illustrating the method by which cache controller (debug) logic of a cache within a memory hierarchy of a processing device processes transaction addresses from a dummy transaction received on a system bus and provides cache access to a debug probe via a peripheral bus during debug mode, according to one embodiment.

FIGS. 7 and 8 and 9 are flow charts illustrating various methods by which the above and other processes of the illustrative embodiments are completed. Although the methods illustrated in FIGS. 7 and 8 and 9 are described with reference to the devices/systems and associated components illustrated by FIGS. 1-6, it should be understood that this is merely for convenience and alternative system and device configurations and components can be employed when implementing the various methods. Specific portions of the method related to the debugger (FIG. 6) may be completed by execution of code associated with CDA utility 635 executing on processor 605 within DPS 105 (FIG. 6) and controlling specific operations of debugger 630 on DPS 105, and the FIG. 7 method is thus described from the perspective of one or more of debugger 630, CDA utility 635, and/or DPS 105. Additionally, specific portions of the methods related to the debugging operations of the device (FIGS. 2-5) may be completed by execution of debug code associated with and/or executing on processor core 160 within device 105 (FIG. 2-4) or cache debug logic within cache/cache controller 172/177 on device 150 to control the setting and resetting of CRR entry values. The FIGS. 8 and 9 methods are described from the perspective of processor core 160 and/or cache 170/175 or generally cache controller debug logic, with an understanding that specific functions can be triggered or initiated by debugger 630 and particularly CDA utility 635 executing on DPS 105.

Referring now to FIG. 7, there is illustrated a flow chart of a computer implemented method for a debugger to initiate and/or trigger specific debugging operations of caches within a target device, where the caches are each configured with a CRR and the device is communicatively coupled to debugger via a JTAG debug probe 120. The method begins when the debugger receives a request to update a memory window while the device is in debug mode (block 702). The device is designed with certain debugging components and logic within the processor and cache controllers to enable the debugger to take control of and/or initiate operations occurring on each of the components for debugging purposes. In debug mode, the processor core is halted and each cache can be configured to no longer allocate storage for data when a miss occurs. The debugger/CDA utility 635 forwards to the device's processor, while the device is in the debug mode, a dummy transaction having a transaction address for processing through the memory hierarchy (block 704). The debugger thus triggers a cache access operation within each level of cache to determine whether the transaction address hits within a particular cache. The forwarding of the dummy transaction while the device is in debug mode triggers each cache to update a cache result register (CRR) of the particular cache with cache access information that indicates whether the transaction address hits within the particular cache. When the transaction address misses within the cache, the CRR is updated to reflect the miss (indicating that the address does not exist within the cache). When the transaction address hits within the particular cache, the cache access information further provides the way and the index at which the information corresponding to the transaction address is located within the particular cache. In response to the forwarding of the dummy transaction, where the dummy transaction is a Read, the debugger receives corresponding data or instructions from the highest level of the memory hierarchy located on the target device (i.e., the final target device memory, memory 180, connected to system bus 205/305 (FIGS. 2/3)) after the transaction address is processed through each of the lower level of caches (block 705). If the dummy read returns the data/instruction from the final target device memory, then the CRRs of the various caches records the dirty bits for the particular cache so as to increase the efficiency of knowing whether the data in the particular cache is the same as the data that was retrieved from system memory by the dummy read. When the cache entry is not dirty, as can then be determined from the CRR, the debugger is able to utilize data returned from the dummy read as the cache data value, thus avoiding having to perform an additional read of the data directly from cache.

At block 706, following the completion of the dummy transaction, the CDA utility receives the hit/miss indicator value retrieved from each CRR of each cache by the debug probe 120 and the CDA utility updates the memory window of the debugger to indicate in which caches a copy of the data is located (block 706). At decision block 708, a determination is made whether an update to a cache viewer (118) of the debugger is required or requested. Also, at decision block 709, a determination is made whether an update of the data/instructions associated with the transaction address is desired to be completed within the memory hierarchy. In response to a request (at block 708) to update the cache viewer, the debugger forwards a request to the debug probe, and the debug probe accesses the CRRs via the peripheral bus and retrieves and returns to the debugger a copy of the content of each CRR (block 714). The debugger then updates the cache viewer with the returned content from the CRRs. In response to an update at the debugger of the data corresponding to the transaction address, the debugger triggers the debug probe to perform a look up within the CRRs of the physical location of the data within the relevant caches (block 710). The JTAG debug probe 120 accesses the CRR via a peripheral bus and performs the access to (and update of) the data within the physical location of the caches identified by the Way and Index values within the CRR (block 712). The process ends at block 716.

FIG. 8 illustrates the memory hierarchy (cache) debug method/process occurring from the device side of the debug system, and specifically those processes initiated by the processor core. The method of FIG. 8 begins at initiator block 802 at which the debugger initiates a memory window update operation while the device is in debug mode. When the device components are set to a debug mode (i.e., the processor core and each cache of the device are set to operate in a debug mode) by the debugger, the processor core halts processing of standard (non-debug) operations. The processor core receives a transaction address associated with a dummy transaction/read (block 804). In response to receipt of the transaction address of the dummy transaction, the processor core forwards the transaction address to a first level cache of the memory hierarchy via the address bus (block 806). The transaction address is received at the cache(s) and processes through the cache's address lookup mechanism. The transaction address is processed through each level of the memory hierarchy, and any data/instructions that are associated with the address (where the operation is a Read) is returned from memory to the processor core. At block 808, the processor core receives the data/instruction corresponding to the transaction address from the highest level of the memory hierarchy (i.e., the memory 180), and the processor core forwards the data to the debugger via the debug interface (145, FIG. 1). The JTAG debug probe 120 initiates retrieval of CR hit/miss information to update the memory window of the debugger (block 810). The debug probe 120 accesses the CRRs via the peripheral bus (block 812) and the debug probe 120 retrieves cache access information and in particular the hit/miss indicator value from the CRRs of the caches (block 814). The debug probe returns/forwards the received CRR information to the debugger. The debug probe 120 also performs all subsequent debug-initiated accesses related to the CRR and the corresponding data stored within the physical storage locations of the caches (while the CRRs remain current, i.e. has not been reset or updated with new cache access information for a different dummy transaction) via the peripheral bus (block 816). The process ends at block 818.

FIG. 9 illustrates the memory hierarchy (cache) debug method/process occurring from the device side of the debug system, and specifically those processes initiated by the cache controller and/or cache debug logic. The method of FIG. 9 begins at initiator block 902 at which the debugger initiates a memory window update operation while the device is in debug mode. At block 904, the cache controller logic of the L1 cache receives the transaction address of the dummy transaction from the processor (or debugger, in an alternate embodiment). The cache controller logic processes the transaction address using a full cache address lookup to determine if the transaction address hits within the cache (block 906). At decision block 908, the cache controller logic determines if a hit is registered at the cache. In response to a miss at the cache (i.e., no hit), the cache controller logic updates the hit/miss indicator of the CRR to indicate a Miss (block 909). In response to a hit within the L1 cache, the cache controller logic further determines the way and the index values of the location within the cache of the corresponding cache line of data/instruction (block 910). This information corresponds to the specific, fixed memory-mapped address within the cache corresponding to the transaction address. The cache controller logic then updates the cache access information within the CRR to include the Hit, Way and Index values (block 912). Additionally, in one embodiment, the cache controller logic also updates the dirty bit of the CRR when the data within the cache line addressed by the transaction address contains dirty data.

The L1 cache controller then forwards the transaction address to the cache controller of the L2 cache (block 914). The L2 ache controller logic performs the similar full address lookup, and determines at block 916 if the transaction address hit within the L2 cache. If the transaction address hits within the L2 cache, the cache controller logic updates the CRR of the L2 cache (block 918). Thus, in response to a hit of the transaction address within the L2 cache, the cache controller updates the CRR of that particular cache (e.g., CRR 195 of L2 cache 175) with cache access information including a way indicator value and an index value corresponding to a physical location within the particular cache at which the information associated with the transaction address is located. The cache controller then forwards the address to the next level of the memory hierarchy (i.e., the memory, according to the illustrative embodiments) (block 920). The memory controller retrieves the relevant data/instructions and returns the data/instruction to the processor (or debugger).

With the data returned to the debugger, the debug probe requests the CRR hit/miss information from each cache's CRR, and the cache forwards the hit/miss indicator value to the debug probe (block 921). This information is utilized to update the memory window. At decision block 922, the cache controllers determine whether a subsequent access is requested to the CRR or to the data stored within the physical storage. The cache controller debug logic enables direct access to the cache (by the debug probe) for specific data updates initiated by the debugger using the WAY and INDEX values within CRR when the Hit/Miss indicator of the CRR indicates cache Hit. In response to receiving a subsequent access request on the peripheral bus, the cache debug logic accesses the CRR of the particular cache to determine if the cache contains a copy of the requested data/instruction. When the cache does contain the copy, (determined based on the value of the hit/miss indicator of the CRR), the cache controller logic provides a copy of the cache access information (content) for the particular cache's CRR in response to the request being for return of cache status for a cache viewer of the debugger (block 924). Also, when the subsequent request is a request to update the data stored within the cache, the cache controller logic enables the debug probe to complete the update of the data using the Way and Index location from the CRR (block 924). The process then ends (block 926).

When the CRR provides an indication that the transaction address hit within the particular cache, the cache controller retrieves the way indicator value and the index value from the CRR and accesses the physical location within the particular cache to perform the subsequent update of the information contained within the physical location. The subsequent update is performed within only those caches in which the transaction address hits and without triggering a full cache address lookup operation.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As generally provided by the described embodiments, a target device (150/250/350/450) is specifically configured within functional hardware and software/logic to enable efficient debugging of a device. The target device comprises: a processor core; and a memory hierarchy coupled to the processor core and including a memory and one or more levels of cache. Each cache has a cache result register (CRR) which captures cache access information that can be utilized to access a location at which specific information is stored within the cache. Each cache further comprises transaction address processing logic within the cache controller that, responsive to receipt of a transaction address of a dummy transaction while the one or more levels of caches are in debug mode, determines whether the transaction address of the dummy transaction hits within the cache; and in response to a hit of the transaction address of the dummy transaction within the cache, the transaction address processing logic automatically updates the CRR of the cache with the cache access information and passes the transaction address down to a next level of the memory hierarchy. In response to a miss of the transaction address of the dummy transaction within the cache, the transaction address processing logic passes the transaction address down to a next level of the memory hierarchy.

The cache access information includes a hit/miss indicator of whether the transaction address hits within the particular cache and a way indicator value and an index value corresponding to a physical location within the cache at which the specific information corresponding to the transaction address of the dummy transaction resides within the particular cache. The CRR has a first pre-set number of bits assigned to store the way indicator value corresponding to a physical location of information corresponding to a transaction address that hits within the cache, a second pre-set number of bits assigned to store the index value corresponding to the physical location within the cache, and a third pre-set bit assigned to store the hit/miss indicator. The first value of the third pre-set bit indicates a cache hit and a second value of the third pre-set bit indicates a cache miss.

The target device 150 also includes: a system bus that connects the processor core to the memory hierarchy and on which the transaction address is transmitted to the memory hierarchy; and a peripheral bus that connects the processor core to each cache within the memory hierarchy and which enables the processor core to obtain hit/miss information from the cache access information contained within the CRR of each cache and perform an access to the physical location within a random access memory (RAM) of the cache utilizing the way indicator value and the index value from the cache access information contained within the CCR.

The target device 150 also includes: a debug interface for connecting the target device 150 to a debugger located on an external device and which controls the exchange of information with the debugger based on received requests from the debugger. The debug interface receives requests from the debugger and triggers the processor core to provide access to the physical location within the cache indicated by the cache access information contained within each CRR, in response to receipt at the device from the debugger of a subsequent address transaction requesting access to a same address as the dummy transaction. The debug interface forwards to the debugger a current value of each CRR in response to a request for current cache information of a particular data to populate a memory window of the debugger. The particular data can be data that is returned from a highest level within the memory hierarchy in response to a dummy read transaction. In addition, the debug logic triggers the processor core to perform an update of the information stored within the physical location utilizing the peripheral bus to access the caches, and the update is performed within only those caches in which the transaction address of the dummy transaction hit, as determined from reading a hit/miss indicator of the CRR, and without triggering a full cache address lookup operation.

In one embodiment, the target device 150 is a data processing system that does not have hardware enforced memory coherency, such that each level of cache within the memory hierarchy is not necessarily coherent and does not necessarily contain a copy of an address and associated cached information corresponding to information from a highest level of the memory hierarchy that is being utilized by the processor core. Thus, an update in a first cache occurs independent of and does not necessarily trigger a corresponding update in a second cache (at any level) within the memory hierarchy.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A device comprising:
   at least one processor core;
   a memory hierarchy coupled to each of the at least one processor core and including a memory and one or more levels of cache, wherein each cache has a cache result register (CRR) which captures cache access information that can be utilized to access a location at which specific information is stored within the cache; and
   transaction address processing logic within each cache of the memory hierarchy that responsive to receipt of a transaction address of a dummy transaction while the one or more levels of caches are in debug mode determines whether the transaction address of the dummy transaction hits within the cache;
   wherein in response to a hit of the transaction address of the dummy transaction within the cache, the transaction address processing logic automatically updates the CRR of the cache with the cache access information and passes the transaction address down to a next level of the memory hierarchy; and
   wherein in response to a miss of the transaction address of the dummy transaction within the cache, the transaction address processing logic passes the transaction address down to a next level of the memory hierarchy.

2. The device of claim 1, wherein the cache access information includes a hit/miss indicator of whether the transaction address hits within a particular cache and a way indicator value and an index value corresponding to a physical storage location within the cache at which the specific information corresponding to the transaction address of the dummy transaction resides within the particular cache.

3. The device of claim 2, wherein the CRR has a first pre-set number of bits assigned to store the way indicator value corresponding to the physical storage location of information corresponding to a transaction address that hits within the cache, a second pre-set number of bits assigned to store the index value corresponding to the physical storage location within the cache, and a third pre-set bit assigned to store the hit/miss indicator, wherein a first value of the third pre-set bit indicates a cache hit and a second value of the third pre-set bit indicates a cache miss.

4. The device of claim 3, wherein, when the cache is a data cache, the CRR also comprises a dirty bit indicator that is assigned to store an indication of whether data within the particular physical storage location of the data cache is dirty, wherein the data is dirty when the data has been recently updated, but has not yet been copied to memory.

5. The device of claim 2, further comprising:
    a system bus that connects the at least one processor core to the associated memory hierarchy and on which the transaction address is transmitted to the associated memory hierarchy; and
    a peripheral bus that connects a debug interface to the at least one processor core and to each cache within the associated memory hierarchy and which enables a debug probe of the debugger to obtain hit/miss information from the cache access information contained within the CRR of each cache and to perform an access to the physical storage location within a random access memory (RAM) of the cache utilizing the way indicator value and the index value from the cache access information contained within the CRR.

6. The device of claim 5, wherein said cache result register connects via said peripheral bus to a Joint Test Action Group (JTAG) debug interface which provides access by the debug probe to said device.

7. The device of claim 1, wherein the one or more levels of cache comprises an L1 cache and a L2 cache and wherein the device is a data processing system that does not have hardware enforced memory coherency, such that each level of cache within the memory hierarchy is not necessarily coherent and does not necessarily contain a copy of an address and associated cached information corresponding to information from a highest level of the memory hierarchy that is being utilized by the processor core, wherein an update in a first cache occurs independent of and does not necessarily trigger a corresponding update in a second cache within the memory hierarchy.

8. The device of claim 1, further comprising:
    a debug interface for connecting the device to a debugger located on an external device; and
    cache debug logic that controls an exchange of information with the debugger based on received requests from the debugger;
    wherein the cache debug logic provides access to a physical storage location within the cache indicated by the cache access information contained within each CRR, in response to receipt at the device from the debugger of a request for access to the data contained within the physical storage location;
    wherein the cache debug logic forwards to the debugger a current value of the cache access information from each CRR in response to a request to populate a cache viewer of the debugger with current information of a physical storage location within the cache of particular data; and
    wherein the cache debug logic forwards to the debugger a copy of Hit/Miss indicator of the CRR for each cache at which the transaction address hits, to populate a memory window of the debugger; and
    wherein the cache debug logic forwards to the debugger a copy of the particular data that is retrieved at the WAY and INDEX location from each cache at which the Hit/Miss indicator of the CRR indicates a hit of the transaction address and a dirty bit indicator indicates that the data is dirty.

9. The device of claim 8, wherein a peripheral bus connection to the cache debug logic enables the debugger to perform an update of the information stored within the physical storage location utilizing the cache access information, wherein the update is performed within only those caches in which the transaction address of the dummy transaction hit, determined from reading the hit/miss indicator of the CRR, and without triggering a full cache address lookup operation.

10. The device of claim 1 further comprising a memory management unit (MMU) connected via the system bus to the processor core and to a first level of the one or more levels of cache and which receives a virtual address of the dummy transaction from the processor core and translates the received virtual address into a real address corresponding to a memory location during processing of the dummy transaction.

11. A computer implemented method for debugging a device using a debugger, the method comprising:
    forwarding to the device, while the device is in debug mode, a dummy transaction having a transaction address that triggers a cache access operation within each level of cache to determine whether the transaction address hits within a particular cache;
    wherein the forwarding of the dummy transaction while the device is in debug mode further triggers each cache to update a cache result register (CRR) of the particular cache with cache access information that indicates whether the transaction address hits within the particular cache, and when the transaction address hits within the particular cache, further indicates a way and an index at which the information corresponding to the transaction address is located within the particular cache;
    in response to completion of the dummy transaction within the device, triggering a debug probe coupled to the device to retrieve hit/miss information from the CRR and updating a memory window of the debugger with a copy of the data returned from the dummy transaction and hit/miss information corresponding to the dummy transaction for each cache within the memory hierarchy, wherein the debug probe of the debugger coupled to a debug interface of the device detects from each CRR of each cache whether the transaction address from the dummy transaction hit within the particular cache; and
    in response to the transaction address having hit within the particular cache, retrieves a way indicator value and an index value from the CRR and performs an access to a specific physical location within the cache indicated by the way indicator value and the index value at which the information is stored within the particular cache;
    wherein each CRR is accessible to the debug interface via a peripheral bus connecting the debug interface to the processor core and to each cache.

12. The method of claim 11, further comprising:
    receiving one of a first request to update a memory window of the debugger with hit/miss information for a transaction address and a second request to update a cache viewer of the debugger with specific HIT/WAY/INDEX information from each cache at which a transaction address of a dummy read transaction hits;

responding to the first request by issuing the dummy transaction to the processor of the device, and triggering the debug probe to retrieve the hit/miss indicator value from each CRR for display of the caches in which the transaction address hits within the memory window of the debugger;

responding to the second request by issuing the dummy transaction to the processor of the device, and triggering the debug probe to access the CRR of each level of cache and return the hit/miss indicator value and the way and index values contained within each respective CRR for display within the cache viewer of the debugger;

responsive to receipt of the hit/miss values from the respective CRRs following the first request, updating the memory window with the information received, wherein said updating provides a copy of the data and information about which levels of the memory hierarchy contains a copy of the data; and responsive to receipt of the hit/miss and way and index values from the respective CRRs, updating the cache viewer with the information received, wherein said updating provides information about a specific way and an index location at which the data resides within each cache contain a copy of the data.

13. The method of claim 11, wherein the device is coupled via a debug probe and a debug interface to a data processing system on which a debugger application executes.

14. The method of claim 13, wherein the debug probe is a Joint Test Action Group (JTAG) probe.

15. A method for enabling debugging within a device having a processor core and a memory hierarchy having one or more levels of cache, the method comprising:

receiving at the processor core a transaction address associated with a dummy read, while the device is in a debug mode, wherein the processor core and each cache of the device are set to operate in the debug mode;

in response to receipt of the transaction address, forwarding the transaction address to a first level cache of a memory hierarchy that includes one or more levels of cache and a memory;

determining within each level of the one or more levels of cache whether the transaction address hits; and in response to a hit of the transaction address within a cache, updating a cache result register (CRR) of that particular cache with cache access information including a hit/miss indicator value and a way indicator value and an index value corresponding to a physical location within the particular cache at which the information associated with the transaction address is located.

16. The method of claim 15, further comprising:

forwarding the transaction address to a next level of the memory hierarchy; and in response to the dummy transaction being a read transaction and the transaction address reaching the memory, returning data associated with the transaction address from the memory;

forwarding a copy of the data to a debugger that is communicatively coupled to the device; and responsive to a request for CRR hit information, forwarding to the debugger a value of the hit/miss indicator within each CRR, wherein the debugger utilizes the hit/miss indicator values to identify within a memory window of the debugger which caches within the memory hierarchy contains a copy of the data corresponding to the transaction address of the dummy transaction.

17. The method of claim 15, further comprising:

enabling a connected debug probe to access each CRR of each cache within the memory hierarchy to determine whether the transaction address hit within the particular cache; and when the CRR provides an indication that the transaction address hit within the particular cache and a request is received from the debug probe for access to the information contained within the physical storage location, retrieving the way indicator value and the index value from the CRR and accessing the physical location within the particular cache to perform the requested access to the stored information;

wherein the access occurs only within those caches in which the transaction address of the dummy transaction hits and without triggering a full cache address lookup operation on the device.

18. The method of claim 17, wherein in response to the debugger issuing a request to modify the information found within the way and index within the CRR of a cache in which the transaction address hits, the method further comprises:

accessing the physical location indicated by the way indicator value and index value of the CRR of the particular cache; and performing the modification of the information stored at the physical location within the particular cache.

19. The method of claim 15, further comprising:

in response to receipt of a request for CRR information from the caches within the memory hierarchy, forwarding to a debug probe a content of each CRR associated with each of the caches within the memory hierarchy; and in response to receipt of a request for the actual data from the different levels of the memory hierarchy when a dirty bit is indicated within the CRR, accessing the way and index location within each cache in which the transaction address hit and for which the dirty bit indicator of the CRR indicates that the stored data is dirty, and retrieving and forwarding to the debugger a copy of the data stored at that particular way and index location for each cache containing the data.

20. The method of claim 15, wherein the CRR comprises a first pre-set number of bits assigned to store the way indicator value corresponding to a physical location of information corresponding to a transaction address that hits within the cache, a second pre-set number of bits assigned to store the index value corresponding to the physical location within the cache, and a third pre-set bit assigned to store a hit/miss indicator, wherein a first value of the third pre-set bit indicates a cache hit and a second value of the third pre-set bit indicates a cache miss and wherein, when the cache is a data cache, the CRR further comprises a dirty bit indicator that indicates whether the data stored at the way and index location within that cache is dirty.

* * * * *